United States Patent [19]
Pierce

[11] Patent Number: 5,203,585
[45] Date of Patent: Apr. 20, 1993

[54] SPLIT-BEAM SUSPENSION SYSTEM

[75] Inventor: William C. Pierce, Muskegon, Mich.

[73] Assignee: Neway Corp., Muskegon, Mich.

[21] Appl. No.: 729,498

[22] Filed: Jul. 12, 1991

[51] Int. Cl.$^5$ .............................................. B60G 7/00
[52] U.S. Cl. ..................................... 280/713; 280/228
[58] Field of Search ............. 280/713, 711, 724, 725, 280/688, 673; 267/248, 256, 228, 25, 28, 31, 32

[56] References Cited

U.S. PATENT DOCUMENTS

| Re. 30,308 | 6/1980 | Masser | 280/713 |
|---|---|---|---|
| 2,903,256 | 9/1959 | Weiss . | |
| 3,406,983 | 10/1968 | Masser | 280/713 |
| 3,801,086 | 4/1974 | Raidel | 280/713 |
| 3,909,036 | 9/1975 | Pound . | |
| 4,168,086 | 9/1979 | Dick et al. | 280/725 |
| 4,262,929 | 4/1981 | Pierce | 280/713 |
| 4,309,045 | 1/1982 | Raidel | 280/711 |
| 4,310,171 | 1/1982 | Merkle | 280/688 |
| 4,858,949 | 8/1989 | Wallace et al. | 280/713 |
| 5,083,812 | 1/1992 | Wallace | 280/713 |

FOREIGN PATENT DOCUMENTS 62-128814  6/1987  Japan ................................. 280/718

*Primary Examiner*—Karin L. Tyson
*Attorney, Agent, or Firm*—Varnum, Riddering, Schmidt & Howlett

[57] ABSTRACT

A vehicle suspension system for wheeled vehicles includes a split-beam trailing arm which is secured to the vehicle frame pivotably at one end for vertical swinging movement relative thereto. The other end of the trailing arm supports an air spring assembly. The split-beam trailing arm comprises a first member and second member which have respective connecting surfaces for assembling the first and second members together in a variety of orientations to accommodate varying spacing needs between the axle or trailing arm and the vehicle frame. The load centers on the trailing arm at the pivoted connected with the frame, the connection with the axle and the connection with the air spring assembly are generally aligned and extend from a point offset from the frame to the frame thereby reducing the torsional moment on the trailing arm. The first and second members are also symmetrical about a transverse plane.

38 Claims, 4 Drawing Sheets

SPLIT-BEAM SUSPENSION SYSTEM

BACKGROUND OF THE INVENTION

1. Field of the Invention

This invention relates to vehicle suspension systems for wheeled vehicles and, more particularly, to a split-beam suspension system suitable for a wide variety of applications from standardized parts and wherein an air spring is positioned on the axis of the frame and the axis of one end of the split beam.

2. Description of Related Art

Vehicle suspension systems having trailing arms suspended from a vehicle frame and a wheel bearing axle suspended from the arm with an air spring mounted between the frame and the trailing arm of the suspension system are disclosed in U.S. Pat. No. 4,693,486 to Pierce et al. issued Sep. 15, 1987; U.S. Pat. No. 3,547,215 to Bird issued Dec. 15, 1970; U.S. Pat. No. 4,262,929 to Pierce issued Aug. 21, 1981, and U.S. Pat. No. 4,858,949 to Wallace et al. issued Aug. 22, 1989. In each of these suspension systems, a unitary trailing arm is pivotably attached at one end to the vehicle frame and has an air spring mounted at the other end of the trailing arm between the arm and the frame.

A problem which plagues the manufacturing of such trailing arms is the lack of any standardization or uniformity for trailing arms. Different vehicles require different spacing between the trailing arm or the axle and the underside of the frame. In order to accommodate these differing requirements, manufacturers must develop tooling for each suspension system. In addition, tooling must be created for both the right and the left hand trailing arms because the arms are not interchangeable from one side of the suspension system to the other. Developing tooling for each of these different vehicles and for the right and left hand trailing arms is extremely expensive. Further, offset loads cause a moment to be induced in the beam along a longitudinal axis. For example, as seen in U.S. Pat. No. 4,858,949 to Wallace, the load bearing points of the trailing arm, i.e. the mount at the front end of the arm, the point where the axle is mounted to the arm, and the rear end of the arm upon which the air spring is mounted, do not lie in the same vertical plane or along the same axis. Therefore, a moment is exerted on the trailing arm. These moments have been compensated for by strengthening the trailing arms and the means for mounting the arm to the vehicle suspension as well as adding a substantial transverse beam to direct the loads to the centerline of the beam. This additional structure results in an increase in the overall weight of the suspension system.

SUMMARY OF INVENTION

According to the invention, a trailing arm is provided which is adapted for use in a trailing arm suspension in a vehicle. Such a suspension is typically adapted to support an axle which carries ground-engaging wheels and has a bracket mounted to a vehicle frame and an air spring suspended from the frame.

The trailing arm comprises a beam having a first end and a second end. The beam first end is adapted to pivotably connect to the bracket, and the beam second end has a first connection surface. The trailing arm further comprises a beam extension having an inner end and an outer end. The inner end of the beam extension has a second connection surface which is shaped to interface with the first connection surface. The beam second end is adapted to support the air spring.

The axle can be supported on either the beam or the beam extension. In assembly, the beam extension is secured to the beam at a predetermined angle. The angle is defined between a line passing through the ends of the beam and a line passing through the ends of the beam extension. The beam extension is secured to the beam by fixedly mounting the second connection surface to the first connection surface so that the trailing arm can have a number of different shapes depending upon the angle between the beam and the beam extension. Preferably the beam extension is welded to the beam.

In another aspect of the invention, the trailing arm comprises a front portion, an axle mount, and a rear portion. The front portion has a terminal end which is adapted to be pivotally connected to the bracket. The axle mount is adapted to be connected to the axle and the rear portion has an air spring support adapted to be connected to the air spring.

Each of the terminal end, the axle mount, and the air spring support has a load bearing center, and all of the centers lie substantially in a single vertical plane. Thus, the trailing arm can be mounted to the frame for pivotable movement about a horizontal axis relative to the frame substantially free of a torsional moment about a longitudinal axis of the trailing arm. Preferably, the front portion has a bent shank forming an angle defining an open space.

In another aspect of the invention, the beam is symmetrical about a transverse plane so that it can be selectively adapted to form a trailing arm on either side of the vehicle. The beam extension is also preferably symmetrical about a transverse plane.

In yet another aspect of the invention, a transverse beam is mounted to the trailing arm and a distal end of the trailing arm at the rear portion has a U-shaped slot opening through the end. The slot is adapted to receive the transverse beam.

BRIEF DESCRIPTION OF THE DRAWINGS

The invention will now be described with reference to the drawings wherein.

DESCRIPTION OF THE PREFERRED EMBODIMENT

Figure 1:
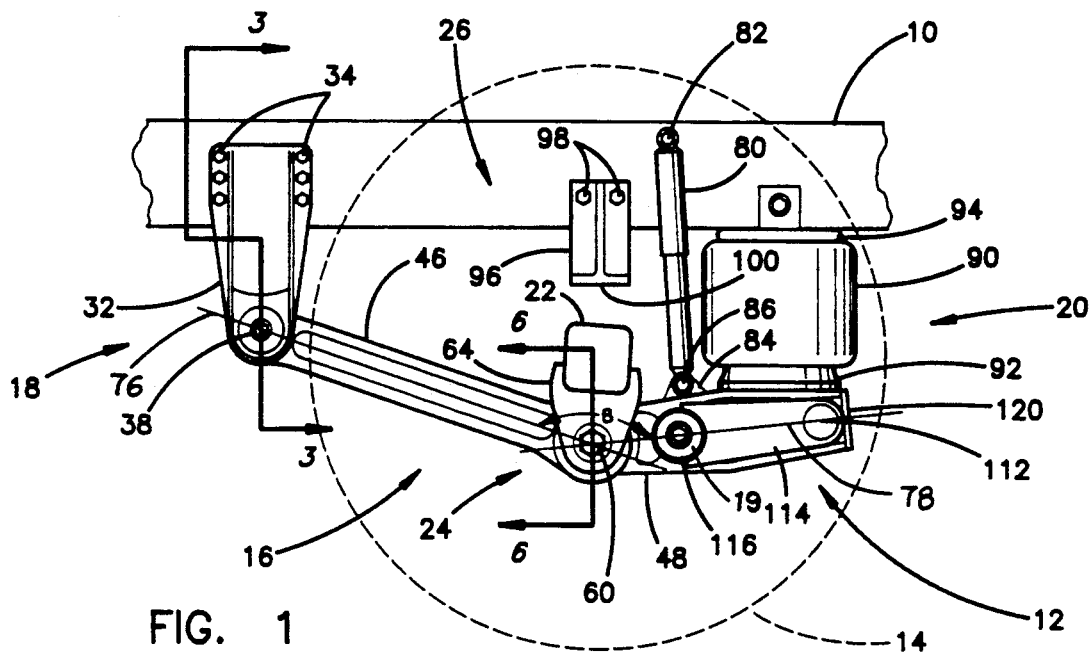
FIG. 1 is an elevational view of a suspension system according to the invention.

Referring now to the drawings and to FIG. 1 in particular, there is shown a portion of a vehicle frame 10 with the front of the vehicle to the left as illustrated in the drawing. A suspension system generally shown as 12 mounts the frame 10 to ground-engaging wheels 14.

The suspension system 12 is formed from a split-beam trailing arm 16 which is pivotably mounted to a frame bracket assembly 18. The split-beam trailing arm 16 mounts an air spring assembly 20, the upper portion of which is secured to the frame 10 so as to cushion the upward and downward movement of the frame with respect to the axle 22. An axle bracket assembly 24 mounts the axle 22 to the split-beam trailing arm 16. The wheels 14 are mounted to the axle 22. A stop assembly 26 is mounted between the frame 10 and the suspension system 12 to limit the downward movement of the frame 10 with respect to the axle 22.

Figure 2:
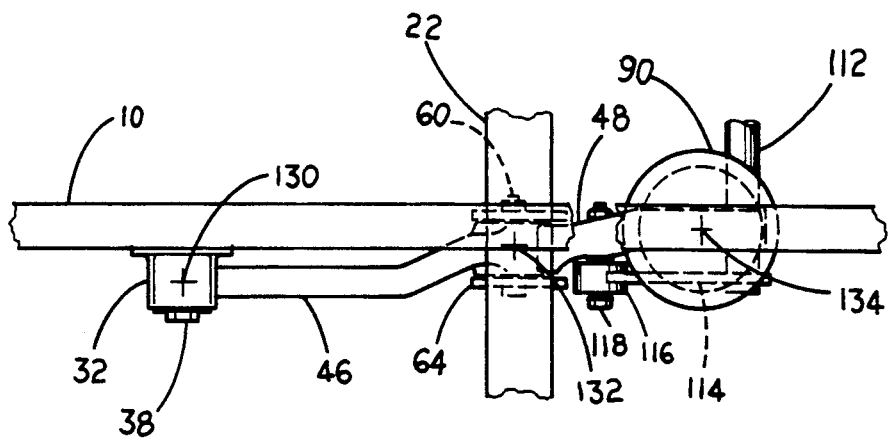
FIG. 2 is a plan view of the suspension system as seen in FIG. 1.
Figure 3:
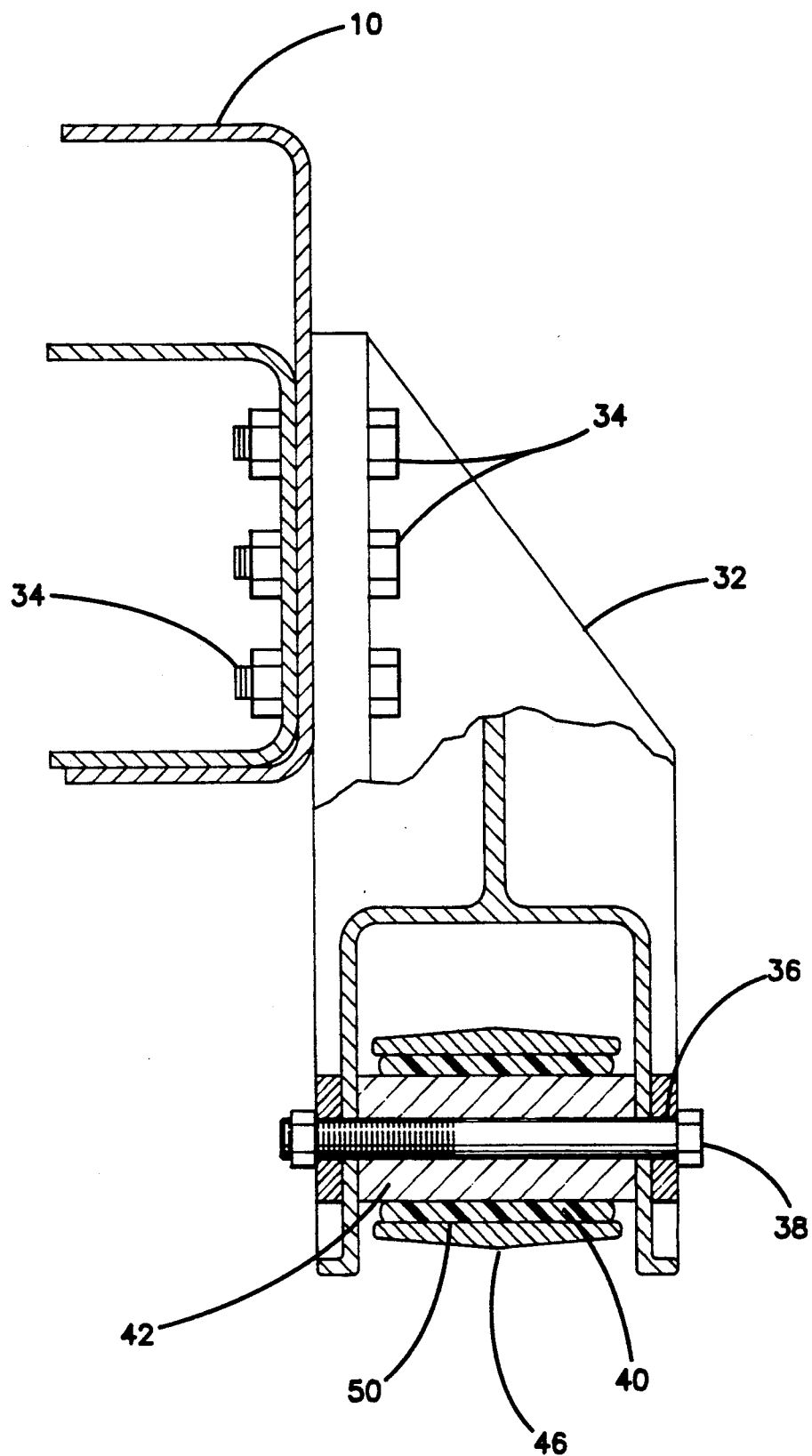
FIG. 3 is a partial sectional view of the frame bracket assembly taken along lines 3—3 of FIG. 1.

The frame bracket assembly 18 is shown in FIGS. 1, 2 and 3 and comprises a frame bracket 32 mounted to the side of the frame 10 by a plurality of bolts 34. The frame bracket 32 projects laterally outwardly and downwardly from the side of the frame 10. The frame bracket 32 has an opening 36 through which a bolt 38 extends.

The split-beam trailing arm 16 as shown in FIGS. 1, 2, and 4 through 7 comprises a first member or beam 46 and a second member or beam extension 48. The first and second members may be formed as forged steel I-beams, or, alternatively, may be cast from a suitable cast steel. They may also be fabricated.

Figure 4:
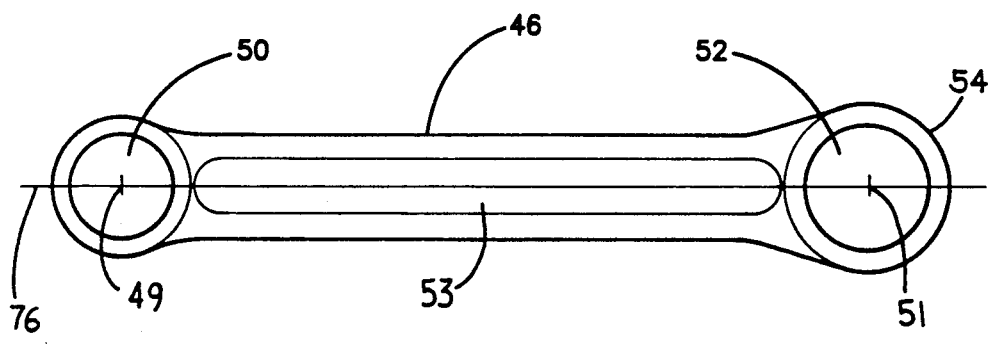
FIG. 4 is an elevational view of a first member of the split-beam suspension arm according to the invention.
Figure 5:
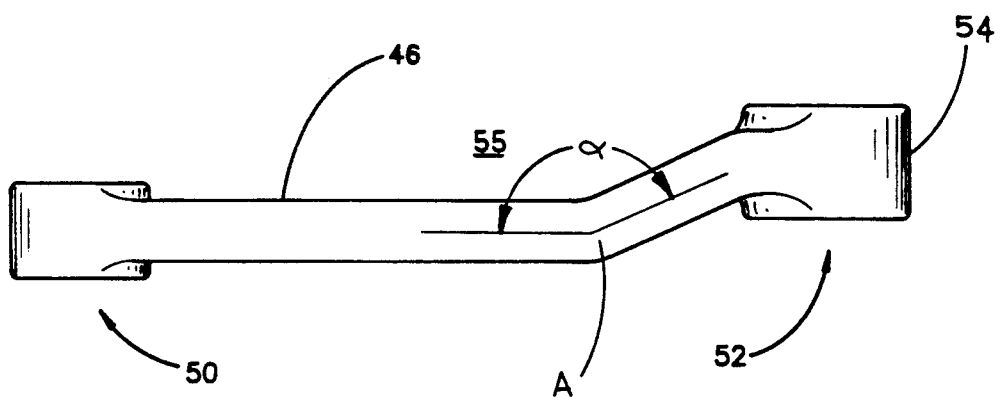
FIG. 5 is a plan view of the first member as seen in FIG. 4.

As seen in FIGS. 4 and 5, the first member 46 has a generally dog-bone shape in elevation with a first opening 50 on one end and second opening 52 on the other end thereof, each opening having an axial center 49, 51, respectively. An arcuate connection surface 54 is adjacent the second opening 52 and has a radius with its origin at the axial center 51. A shank 53 extends between the openings 50, 52. In FIG. 4 it can be seen that the first member 46 is symmetrical about a transverse plane extending through the axes 49, 51 of the openings 50, 52. As shown in FIG. 5, the shank 53 is bent at A to form an angle α thereby partially defining an open space 55.

Looking now at FIG. 3, the first opening 50 mounts a rubber bushing 40 and receives the bolt 38 to pivotably mount the first member 46 to the frame bracket assembly 18. The first member 46 is pivotably mounted to the frame bracket 32 for pivotable movement with respect thereto through an inner bushing sleeve 42 and a rubber bushing 40. The inner bushing sleeve 42 abuts against the interior of the depending arms of the frame bracket 32 so that the tightening of the bolt 38 will clamp the inner bushing sleeve 42 tightly within the frame bracket 32. On the other hand, the rubber bushing 40 has a length less than the length of the inner bushing sleeve 42 and thus is rotatable with respect to the inner sleeve 42. In practice, the rubber bushing 40 provides articulation of the first member 46 of the split-beam trailing arm 16 about the bolt 38 radially and rotationally as well as axially. In other words, the split-beam trailing arm 16 can pivotably articulate about the axis of the bolt 38 as well as about an axis perpendicular to the axis of the bolt 38.

Figure 6:
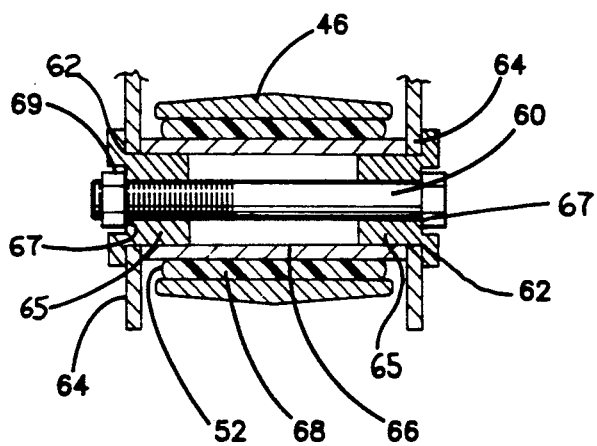
FIG. 6 is a partial sectional view of the axle bracket bushing taken along lines 6—6 of FIG. 1.

The second opening 52 in first member 46 receives a rubber bushing 58 and bolt 60 for mounting the axle bracket assembly 24 to the first member 46. As seen in FIG. 6, the axle bracket assembly 24 has a pair of spaced depending arms 64, each having an opening 62, with the openings in axial alignment. A cylindrical inner bushing sleeve 66 has an inside diameter at least equivalent to the diameter of each opening 62 and extends between the arms 64 in axial alignment with the openings 62. An adapter 65 is received in each opening 62 and extends partially into the inner sleeve. Each adapter 65 has an aperture 67 coaxial with its corresponding opening 62 and which is adapted to receive the bolt 60. A rubber bushing 58 is received over the inner sleeve 66 in conventional manner and press-fit into the opening 52. The adapters 65 and inner sleeve 66 receive the bolt 60 with the ends of the sleeve 66 tightly abutting the inner surface of the axle bracket arms 64. The bolt 60 is tightened by a nut 69. Although the preferred embodiment shows the axle 22 and axle bracket assembly 24 attached to the front member 46, the axle bracket assembly 24 may alternatively be mounted at an appropriate opening in the second member 48.

Figure 7:
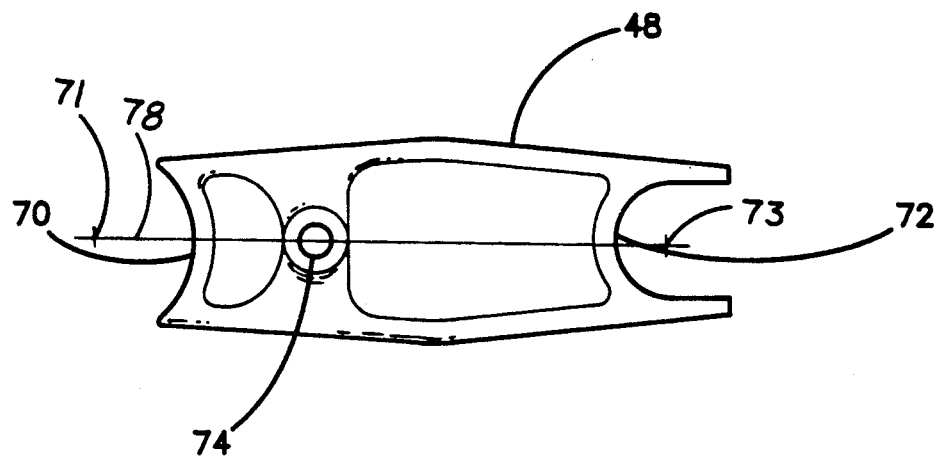
FIG. 7 is an elevational view of a second member of the split-beam trailing arm.
Figure 8:
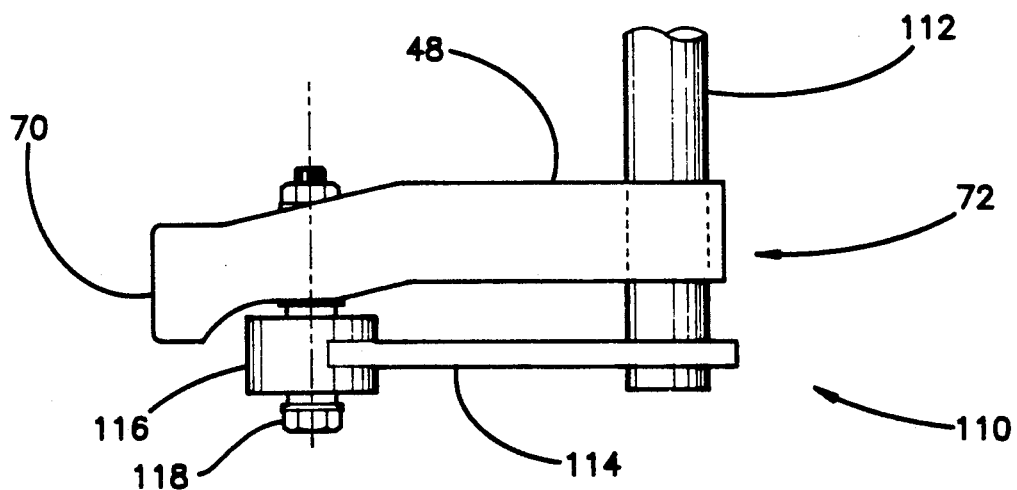
FIG. 8 is a plan view of the second member as seen in FIG. 7 showing the stabilizer arm in greater detail.

As seen in FIGS. 7 and 8, the second member 48 incorporates a C-shaped end connection surface 70 on one end which is complementary to the arcuate end connection surface 54 of the first member 46. In other words, the radius of the connection surface 70 is the same length as the radius of the connection surface 54 and has its origin at axial center 71. The second member 48 has a U-shaped opening 72 on the other end with a radius having its origin at axial center 73. An opening 74 through the body of the second member 48 is disposed intermediate the ends. The U-shaped opening 72 and opening 74 are suitable for mounting a transverse beam and a stabilizer, as discussed further, below. It can be seen in FIG. 7 that the second member 48 is symmetrical about a transverse plane extending through the axes 71, 73.

The C-shaped end 70 of the second member 48 is fixedly attached to the arcuate end surface 54 of the first member 46 by suitable means such as welding, to create a unitary trailing arm 16 with the axial centers 51, 71 being substantially coincident. In light of the radius of curvature of the arcuate end surface 54 of the first member 46 and the complementary C-shaped end 70 of the second member, the first member 46 may be attached to the second member in a wide variety of angular positions. For example, the second member 48 can be welded to the first member such that a line 76 extending through the centers 49, 51 of the respective openings 50, 52 of the first member 46 coincides with a line 78 extending through the centers 71, 73 at the ends of the second member 48. In other words, the trailing arm in one configuration would appear substantially straight in elevation. However, if the second member 48 is attached to the first member 46 such that the lines 76 and 78 are at an angle β less than 180 degrees with respect to each other, as seen in FIG. 1, then the distance between the axle 22 and the lower surface of the frame 10 will increase. By thus varying the angle β, standardized sizes of the first member 46 and second member 48 may be used for a wide variety of suspension systems to accommodate variable spacing needs between the axle 22 and the lower surface of the frame 10.

As seen in FIG. 1, a shock absorber 80 can be provided between the frame 10 and the split-beam trailing arm 16. To this end, a bolt 82 mounts the shock absorber 80 at an upper portion thereof to the frame 10. The lower portion of the shock absorber 80 is mounted to the second member 48 of the split-beam trailing arm 16 through a shock mounting bracket 84 and a bolt 86. Although not shown in the drawings, the shock absorber may alternately be mounted in front of the axle 22 such that it extends between the frame 10 and the first member 46 of the split-beam trailing arm 16.

As seen in FIGS. 1 and 2, the air spring assembly 20 comprises an air spring bladder 90 which is supported between a piston can 92 and an upper mounting plate 94. The piston can 92 is fixedly attached to the top surface of the second member 48 by suitable means such as welding. The upper mounting plate 94 is fixedly attached to the underside of frame 10 by suitable fastening means such as bolts. As seen in FIG. 2, the air spring is mounted directly below the frame and on top of the second member 48. Prior suspension systems have mounted the upper mounting plate on an arm which extended a short lateral distance from the longitudinal axis of the frame whereby the air spring was either offset from the frame or offset from the trailing arm or both. As discussed further below, this necessitated extra components to compensate for torsional loading of the trailing arm. The mounting of the air spring as seen in FIG. 2, which is directly below the frame 10 and above the second member 48 results in a significant decrease in the moment exerted on the trailing arm.

As seen in FIG. 1, a bump stop 96 is mounted to the trailer frame 10 by a plurality of bolts 98. Bump stop 96 is mounted immediately above the axle 22. If the vehicle passes over a bump or other obstruction which causes an excessive amount of deflection of the suspension system 12, the axle 22 will contact the bottom surface 100 of bump stop 96. This "bottoming out" of the suspension system 12 occurs when the air spring assembly 20 cannot absorb such a drastic deflection of the axle 22 relative to the frame 10.

In some other suspension systems, the bump stop has been mounted inside the air spring. Because of the large amount of force exerted when the suspension system bottoms out, the bump stop must be designed to withstand excessive force, typically in the range of 30,000 pounds. An air spring is designed to support a lesser amount of force, typically in the range of 6,000 pounds. By mounting the bump stop inside the air spring, the air spring assembly and mounting means had to be strengthened to withstand this extreme amount of force, which typically involves the use of heavier and stronger materials. As seen in FIG. 1, the bump stop 96 has been removed from the air spring assembly 20. Therefore, the second member 48 upon which the air spring assembly 20 is mounted, can satisfactorily withstand a maximum amount of force in the range of 6,000 pounds. The truck frame 10, the bump stop 96 and the axle 22 are designed to absorb the greater amount of force, in the range of 30,000 pounds. Through this design, the large bottoming-out force is borne by the axle 22 and wheel construction rather than by the air spring assembly 20. Conventional axle and wheel assemblies are already engineered to withstand this excessive force and therefore the overall weight of the suspension system can be reduced by the reduction of material previously used to strengthen the air spring assembly and mounting means.

As seen in FIGS. 1, 2, 7 and 8, the second member 48 further has a transverse stabilizing assembly 110 mounted thereto. The stabilizing assembly is disclosed in U.S. Pat. No. 5,083,812 issued Jan. 28, 1992, incorporated herein by reference. In the present embodiment, the stabilizing assembly 110 comprises a transverse beam 112, a blade 114 and a sleeve 116. The transverse beam 112 extends between the two trailing arms 16 which support the axle 22 on either side of the vehicle frame 10. The transverse beam 112 is tightly received within U-shaped opening 72 of the second member 48, preferably mounted therein by a bushing 117. Ideally, the longitudinal axis of the transverse beam 112 will be coincident with the axial center 73. A retainer plate 120 can be mounted across the opening of the U-shaped opening 72 by means such as bolts. The retainer plate 120 is not attached to the transverse beam 112, but merely serves to avoid inadvertent movement of the beam 112 out of the U-shaped opening 72. The retainer plate 120 is optional.

The transverse beam 112 extends beyond the second member 48 and has one end of the blade 114 fixedly attached thereto by suitable means such as welding. The blade 114 extends forward from the transverse beam and is fixedly attached to the outer surface of a sleeve 116. The sleeve 116 receives a bushing 119 such as that disclosed in U.S. Pat. No. 4,262,929 to Pierce, which is incorporated herein by reference. The bushing 119 in turn receives one end of a bolt 118, the other end of which is fixedly mounted within opening 74 of the second member 48. The bushing 119 permits universal radial and axial articulation of the outer surface of sleeve 116 relative to the bolt 118. This particular bushing 119 permits tailoring of a nonlinear roll rate for the suspension. The bushing 117, at the connection of the transverse beam 112 to the second member 48, may also be of the type disclosed in U.S. Pat. No. 4,262,929.

While the transverse stabilizing assembly 110 is adapted to control roll rate, lateral stability is enhanced by a track bar or yoke (not shown) extending from the axle 22 to the frame 10 in a conventional manner.

In operation, a vehicle mounted on frame 10 is supported on the wheels 14 through the suspension system 12 and the axle 22. On either side of the vehicle, support is provided at the forward end through the split-beam trailing arm 16 and the frame bracket assembly 18 and at the rear end through the air spring assembly 20. As the wheels hit bumps, the axle 22 will move upwardly and downwardly with respect to the frame 10. As this movement occurs, the split-beam trailing arm 16 will pivot about the bolt 38 against the pressure of the air spring 90. The downward extent of the movement of the frame 10 with respect to the axle 22 is limited by the bump stop 96. As the suspension system moves up and down, the axle is prevented from moving laterally by the track bar. When the vehicle mounted on frame 10 is moving straight ahead and wheels 14 at opposite sides of the vehicle roll over similar surfaces, there is no significant differential movement between the pair of split-beam trailing arms 16 on each side of the vehicle frame. Assume now that the vehicle is encountering road conditions which cause differential vertical swinging movement of the split-beam trailing arms 16. This condition occurs when the vehicle rounds a curve so that it tends to lean to one side. It also occurs when one wheel 14 traverses a bump or depression while the other wheel passes over an unlike surface. Such movement creates an angular displacement of the trailing arms relative to the frame about an axis through the respective bolts 38. This angular displacement is resisted by the attempt to twist the stabilizing assembly 110 at the rear end of each split-beam trailing arm 16. The stabilizer 110 provides the ability to tailor a more or less linear roll rate for the particular suspension by adjusting the spring rates of the bushings 117 and 119.

Another problem encountered with prior suspension systems was the creation of a significant amount of bending moment exerted on the trailing arm because of the design of the trailing arm. Typically, the load points of the trailing arm do not lie along the longitudinal axis of the vehicle frame. For example, as seen in U.S. Pat. No. 4,858,949 to Wallace, two of the load bearing points, the front attachment point and the axle mounting, lie along the same longitudinal axis on the outboard side of the vehicle frame whereas the air spring, mounted on the other end of the trailing arm, is mounted on an offset axis a short lateral distance from the axis of the other load points. These different axes for the load bearing points result in a significant torsional moment in the trailing arm. This torsional moment must be absorbed by the axle bracket 24. The significant torsional moment increases wear on the bushings and articulatable mountings between the trailing arm and the frame, thereby shortening the effective life of these components.

The suspension system 12 of the present invention minimizes the torsional moment by decreasing the lateral distance between the longitudinal axes of the load bearing points, thereby extending the life of the elastic bushings for mounting the suspension system 12.

As seen in FIG. 2, the first load bearing point 130 for the frame bracket assembly 18 is outboard of the frame 10. The second load bearing point 132 at the axle bracket assembly 24 is slightly inboard of the first load bearing point 130. This placement of the load bearing points 130, 132 is achieved by the angle α of the bent shank 53 of the first member 46 (see FIG. 4). The bent shank also provides sufficient open space 55 adjacent the first member 46 to accommodate equipment usually located there such as brake actuators and the like. The third load bearing point 134 at the air spring assembly 20 is mounted directly below the vehicle frame 10 and preferably lies in substantially the same vertical plane as the first and second load bearing points 130, 132. Thus, no offset loading is generated at the third load bearing point 134. Essentially, the lateral distance of the load bearing points has been stepped inward from the frame bracket assembly 18 to the air spring assembly 20, thereby minimizing the torsional moment on the trailing arm. This reduction in the torsional moment experienced by the trailing arm is a significant improvement over the suspension systems of the prior art.

It will further be seen that the first and second members will function equally well on either side of the vehicle because each is symmetrical about a transverse plane. For example, a first member adapted for use on the left side of a vehicle can be used equally well on the right side of the vehicle by turning it over. As discussed above, the angle β between the first and second members is adjusted prior to fixing the members together. Thus, two identical first members and two identical second members can be adapted and assembled according to the invention for a complete trailing arm suspension on both sides of any vehicle.

While particular embodiments of the invention have been shown, it will be understood, of course, that the invention is not limited thereto since modifications may be made by those skilled in the art, particular in light of the foregoing teachings. Reasonable variation and modification are possible within the foregoing disclosure of the invention without departing from the scope of the invention which is defined by the appended claims.

The embodiments of the invention in which an exclusive property or privilege is claimed are defined as follows:

1. A trailing arm for a vehicle trailing arm suspension, said suspension being adapted to support an axle carrying ground-engaging wheels, and having a bracket mounted to a vehicle frame and an air spring suspended from the vehicle frame rearwardly of the bracket, the trailing arm comprising:
    a beam and a beam extension;
    an axle bracket mounted to the beam for supporting the axle;
    said beam having a first end and a second end, the first end being adapted to be pivotably connected to the bracket, the second end having a first connection surface;
    said beam extension being elongated and having an inner end and an outer end, the outer end being adapted to support the air spring, the inner end having a second connection surface rigidly attached to the first connection surface in a position wherein the outer end extends generally rearwardly of the inner end when the trailing arm is mounted to a vehicle and the beam is disposed relative to the beam extension at an angle defined between a line passing through the ends of the beam and a line passing through the ends of the beam extension,
    one of said first connection surface and said second connection surface being shaped to interface with the other of said first connection surface and said second connection surface in a number of different relative angular relationships while maintaining the outer end generally rearwardly of the inner end whereby the angle is preselected from a range of angles for different vehicles, each vehicle requiring a different angle so that the beam and the beam extension can be rigidly attached to each other to form a trailing arm for any one of said different vehicles.

2. A trailing arm according to claim 1 wherein the first connection surface is arcuate.

3. A trailing arm according to claim 2 wherein the first and second connection surfaces are secured by welding.

4. A trailing arm according to claim 1 wherein the beam has an opening extending therethrough near the second end and said axle bracket is mounted to the beam by a bushing in said opening.

5. A trailing arm according to claim 4 wherein the opening has a longitudinal axis and the first connection surface is arcuate, having a radius with its origin on the longitudinal axis.

6. A trailing arm according to claim 1 wherein the beam extension comprises a generally horizontally disposed U-shaped slot opening through the outer end.

7. A trailing arm according to claim 1 wherein the beam extension comprises an opening extending therethrough intermediate the ends.

8. A trailing arm suspension for a vehicle comprising a pair of trailing arms according to claim 1, each having a bracket pivotably mounted at one end for mounting the trailing arms to a vehicle frame, and an air spring at another end for mounting to a vehicle frame for vertical swinging movement of the trailing arms with respect to the frame.

9. In a trailing arm suspension for a vehicle, said suspension having a trailing arm adapted to support an axle carrying ground-engaging wheels, and further having a bracket adapted to be mounted to a vehicle frame and an air spring adapted to be mounted to the frame, the improvement wherein:
    the trailing arm has a front portion, an axle mount, and a rear portion, the front portion having a terminal end pivotably connected to the bracket, the axle mount being adapted to be connected to the axle and the rear portion having an air spring support connected to and supporting the air spring;

the front portion further having a shank extending rearwardly from the terminal end, said shank having a bend so that part of the shank extends rearwardly and then laterally inwardly toward the axle mount, thereby partially defining an open space adjacent to the trailing arm;

each of said terminal end, axle mount, and air spring support having a load bearing center, said centers laying in a single vertical plane;

whereby the trailing arm can be mounted to the frame for pivotal movement thereof about a horizontal axis relative to the frame and accommodate equipment mounted on the vehicle within the open space while being substantially free of a torsional moment about a longitudinal axis of the trailing arm.

10. A trailing arm suspension according to claim 9 wherein the load bearing center at the air spring support is on a vertical line extending through the vehicle frame.

11. A trailing arm suspension according to claim 10 wherein the load bearing center at the terminal end is on a vertical line extending through the bracket and is laterally offset from the frame.

12. A trailing arm suspension according to claim 9 wherein the front portion comprises a beam and the rear portion comprises a separate beam extension, said beam having a rearward end, the rearward end having a first connection surface;

said beam extension having an inner end, the inner end having a second connection surface adapted to be secured to the first connection surface and shaped to interface with the first connection surface in a manner whereby the beam extension can be fixedly secured to the beam at the first and second connection surfaces at a predetermined number of angles.

13. A trailing arm suspension according to claim 12 wherein the beam extension has an outer end and comprises a generally horizontally disposed U-shaped slot opening through the outer end.

14. A trailing arm suspension for a vehicle comprising a pair of trailing arms according to claim 9, each having a bracket pivotably mounted at one end for mounting the trailing arms to a vehicle frame, and an air spring at another end for mounting to a vehicle frame for vertical swinging movement of the trailing arms with respect to the frame.

15. A trailing arm for a trailing arm suspension in a vehicle, said suspension being adapted to support an axle carrying ground-engaging wheels, and having a bracket mounted to a vehicle frame on each side of said vehicle, and an air spring suspended from the frame on each side of the vehicle, rearwardly of the respective bracket, the trailing arm comprising:

a beam and a beam extension, one of said beam and said beam extension having means to support the axle;

said beam having a first end and a second end with a shank extending therebetween, said shank having a bend so that the shank extends rearwardly from the first end and then laterally toward the second end, thereby partially defining an open space adjacent to the trailing arm to accommodate equipment mounted on the vehicle within the open space when the trailing arm is mounted to the vehicle;

said beam being symmetrical about a transverse plane extending through the beam ends, the first end being adapted to be pivotably connected to the bracket for movement about an axis lying substantially in the transverse plane, the second end having a first connection surface;

said beam extension being adapted to support the air spring and having an inner end, the inner end having a second connection surface for being rigidly attached to the first connection surface to form a trailing arm having a predetermined angular configuration, said second surface being shaped to interface with the first connection surface in a number of different relative angular relationships and being secured to the beam at the said first and second connection surfaces while extending generally rearwardly, whereby the beam can be selectively adapted to form a trailing arm on each side of the vehicle, said trailing arm having the same predetermined angular configuration on each side of the vehicle, when the first connection surface is rigidly mounted to the second connection surface, the beam first end is mounted to one of said brackets and the beam extension supports the respective air spring.

16. A trailing arm according to claim 15 wherein the beam extension has an outer end and the beam extension is symmetrical about a transverse plane extending through the ends of the beam extension.

17. A trailing arm according to claim 16 wherein the first end includes an opening extending laterally through the beam along a longitudinal axis lying in the transverse plane, said opening being adapted to receive a bushed pin in the bracket when the trailing arm is mounted to the vehicle frame.

18. A trailing arm according to claim 15 wherein the second connection surface is complementary in shape to the first connection surface.

19. A trailing arm according to claim 18 wherein the first connection surface is arcuate.

20. A trailing arm according to claim 19 wherein the first and second connection surfaces are secured by welding.

21. A trailing arm according to claim 15 wherein the axle supporting means comprises an axle bracket mounted to the beam.

22. A trailing arm according to claim 21 wherein the beam has an opening extending therethrough near the second end and said axle bracket is mounted to the beam by a bushing in said opening.

23. A trailing arm according to claim 22 wherein the opening has a longitudinal axis and the first connection surface is arcuate, having a radius with its origin on the longitudinal axis.

24. A trailing arm according to claim 15 wherein the beam extension comprises a generally horizontally disposed U-shaped slot opening through the outer end.

25. A trailing arm according to claim 15 wherein the beam extension comprises an opening extending therethrough intermediate the ends.

26. A trailing arm suspension for a vehicle comprising a pair of trailing arms according to claim 15, each having a bracket pivotably mounted at one end for mounting the trailing arms to a vehicle frame, and an air spring at another end for mounting to a vehicle frame for vertical swinging movement of the trailing arms with respect to the frame.

27. A trailing arm for a trailing arm suspension in a vehicle, said suspension being adapted to support an axle carrying ground-engaging wheels, and having a bracket mounted to a vehicle frame on each side of said vehicle, and an air spring suspended from the frame on each side of the vehicle, rearwardly of the respective bracket, the trailing arm comprising:

a beam and a beam extension;

an axle bracket mounted to the beam for supporting the axle;

said beam having a first end and a second end, the first end being adapted to be pivotably connected to the bracket, the second end having a first connection surface;

said beam extension being elongated and having an inner end and an outer end, the inner end having a second connection surface for being rigidly attached to the first connection surface to form a trailing arm having a predetermined angular configuration, said second connection surface being shaped to interface with the first connection surface in a number of different relative angular relationships while maintaining the outer end generally rearwardly of the inner end when the trailing arm is mounted to a vehicle, said outer end being adapted to support the air spring and further being laterally offset from said inner end, and said beam extension being symmetrical about a transverse plane extending through the ends of the beam extension, whereby the beam extension can be selectively adapted to form a trailing arm on each side of the vehicle, said trailing arm having the same predetermined angular configuration on each side of the vehicle, when the first connection surface is rigidly mounted to the second connection surface, the beam first end is mounted to one of said brackets and the beam extension supports the respective air spring.

28. A trailing arm according to claim 27 wherein the second connection surface is complementary in shape to the first connection surface.

29. A trailing arm according to claim 28 wherein the first connection surface is arcuate.

30. A trailing arm according to claim 29 wherein the first and second connection surfaces are secured by welding.

31. A trailing arm according to claim 27 wherein the beam has an opening extending therethrough near the second end and said axle bracket is mounted to the beam by a bushing in said opening.

32. A trailing arm according to claim 31 wherein the opening has a longitudinal axis and the first connection surface is arcuate, having a radius with its origin on the longitudinal axis.

33. A trailing arm according to claim 27 wherein the beam extension comprises a generally horizontally disposed U-shaped slot opening through the outer end.

34. A trailing arm according to claim 27 wherein the beam extension comprises an opening extending therethrough intermediate the ends.

35. A trailing arm suspension for a vehicle comprising a pair of trailing arms according to claim 27, each having a bracket pivotably mounted at one end for mounting the trailing arms to a vehicle frame, and an air spring at another end for mounting to a vehicle frame for vertical swinging movement of the trailing arms with respect to the frame.

36. In a trailing arm for a suspension for a vehicle having a frame with a bracket mounted thereto, said suspension comprising:

the trailing arm having a forward portion and a rearward portion;

said forward portion adapted to be pivotably mounted to the bracket for vertical swinging movement relative to the frame and said rearward portion adapted to support an air spring between the trailing arm and the frame for cushioning the swinging movement of the trailing arm;

means for mounting an axle carrying ground-engaging wheels to the trailing arm; and a transverse beam mounted to the trailing arm to resist roll in the suspension, the improvement wherein:

the trailing arm has a distal end at the rear portion, a U-shaped slot opening through the distal end, said slot being adapted to receive the transverse beam, and a plate secured to the distal end of the trailing arm to cover the open end of the slot.

37. A trailing arm according to claim 36 wherein the transverse beam is supported within the slot by a bushing.

38. A trailing arm according to claim 37 wherein the transverse beam has a member rigidly secured thereto and extending forwardly thereof, said member being mounted to the rearward portion by a bushed connection forwardly of the slot.

* * * * *